(12) United States Patent
Chentanez et al.

(10) Patent No.: US 10,410,431 B2
(45) Date of Patent: Sep. 10, 2019

(54) SKINNING A CLUSTER BASED SIMULATION WITH A VISUAL MESH USING INTERPOLATED ORIENTATION AND POSITION

(71) Applicant: NVIDIA CORPORATION, Santa Clara, CA (US)

(72) Inventors: Nuttapong Chentanez, Zurich (FI); Matthias Mueller-Fischer, Uerikon (CH); Miles Macklin, Freemans Bay (NZ)

(73) Assignee: Nvidia Corporation, Santa Clara, CA (US)

( * ) Notice: Subject to any disclaimer, the term of this patent is extended or adjusted under 35 U.S.C. 154(b) by 26 days.

(21) Appl. No.: 15/646,990

(22) Filed: Jul. 11, 2017

(65) Prior Publication Data

US 2019/0019345 A1     Jan. 17, 2019

(51) Int. Cl.
*G06T 19/20*     (2011.01)
*G06T 13/20*     (2011.01)
*G06T 17/20*     (2006.01)

(52) U.S. Cl.
CPC ............... *G06T 19/20* (2013.01); *G06T 13/20* (2013.01); *G06T 17/205* (2013.01); *G06T 2210/56* (2013.01); *G06T 2219/2021* (2013.01)

(58) Field of Classification Search
CPC .................. G06T 19/20; G06T 17/205; G06T 2219/2021; G06T 13/20; G06T 2210/56
See application file for complete search history.

(56) References Cited

U.S. PATENT DOCUMENTS

| 6,009,435 | A  | 12/1999 | Taubin et al. |
| 6,937,240 | B2 | 8/2005  | Sasaki |
| 7,609,261 | B2 | 10/2009 | Gibbs et al. |
| 7,859,538 | B2 | 12/2010 | Isner et al. |
| 7,872,653 | B2 | 1/2011  | Zhou et al. |
| 8,310,480 | B2 | 11/2012 | Kim et al. |
| 8,531,464 | B1 | 9/2013  | Cohen Bengio |

(Continued)

FOREIGN PATENT DOCUMENTS

| CN | 104021584 A | 9/2014 |
| WO | 2016207311 A1 | 12/2016 |

OTHER PUBLICATIONS

Muller et al., "Solid Simulation with Oriented Particles". ACM Transactions on Graphics • Jul. 2011 (Year: 2011).*

(Continued)

*Primary Examiner* — Tapas Mazumder (57) ABSTRACT

Embodiments of the present invention provide a method for simulating deformable solids undergoing large plastic deformation and topological changes using shape matching. Positional information for particles and orientation information from clusters is used to simulate deformable solids represented by particles. Each visual vertex stores references to particles that influence the vertex, and stores the local position of the particles. A two-step method interpolates orientation from clusters to particles, and uses the orientation and position of particles to skin the visual mesh vertices. This results in a fast method that can reproduce rotation and does not require the visual mesh vertex to be located within a convex hull of particles.

21 Claims, 7 Drawing Sheets

(56) References Cited

U.S. PATENT DOCUMENTS

| | | |
|---|---|---|
| 2005/0069174 A1* | 3/2005 | Uchiyama .............. G06T 7/74 |
| | | 382/103 |
| 2014/0078144 A1 | 3/2014 | Berriman et al. |
| 2015/0002517 A1 | 1/2015 | Lee et al. |
| 2017/0032055 A1 | 2/2017 | Eisemann et al. |
| 2017/0032560 A1 | 2/2017 | Dionne et al. |
| 2017/0032579 A1 | 2/2017 | Eisemann et al. |

OTHER PUBLICATIONS

Sumeet Arora. Skinning a character. PACKT Books. https://www.packtpub.com/books/content/skinning-character, Apr. 2014. 14 pages.
Character Animation Basics. DigitalRune Documentation. 4 pages. http://digitalrune.github.io/DigitalRune-Documentation/html/47e63a0f-e347-43fa-802e-bft707e804b6.htm.
Tutorial 9: Skeletal Animation. 13 pages. https://research.ncl.ac.uk/.../skeletalanimation/Tutorial%209%20-%20Skeletal%20Ani . . . .
Ladislav Kavan; et al. Spherical Blend Skinning: A Real-time Deformation of Articulated Models. Czech Technical University in Prague. 8 pages.
Hiagit Schechter; et al. The Beta Mesh: a New Approach for Temporally Coherent Particle Skinning. University of British Columbia. 14 pages. UBC Computer Science Technical Report TR-2013-02.
Ben Jones; et al. Ductile Fracture for Clustered Shape Matching. Mar. 1, 2016; 6 pages.

\* cited by examiner

SKINNING A CLUSTER BASED SIMULATION WITH A VISUAL MESH USING INTERPOLATED ORIENTATION AND POSITION

FIELD

Embodiments of the present invention generally relate to the field of computer graphics. More specifically, embodiments of the present invention relate to systems and methods for performing simulation teachings such as skinning a group of particles with a visual mesh.

BACKGROUND

There is a growing need, in the field of computer graphics, and simulation involving the same, to render a skinned visual mesh to achieve smooth deformation of deformable objects, such as a piece of dough. Shape matching is a popular method for simulating deformable objects in real time as it is fast and stable at large time steps. Although shape matching can simulate large elastic deformation and ductile fracturing, these techniques are limited to situations with relatively small plastic deformation.

Some existing skinning techniques use shape matching for clusters of particles having orientation information. The visual mesh is then skinned to either the clusters or the particles. When skinning to the clusters using shape matching techniques, the orientation information is utilized, and the visual vertex is not required to be within a convex hull of the cluster's centers. However, a very large number of clusters are required for this skinning method to achieve smooth deformation because the clusters are typically spaced far apart.

Alternatively, some skinning techniques skin to the particles, where only a relatively small number of particles are required when the particles are densely sampled. However, this method requires that the visual vertex be within the convex hull of the particles to prevent the appearance of extrapolation artifacts. Further, rotation information may not be reproduced if displacement is interpolated.

What is needed is a technique for skinning a cluster based computer simulation with a visual mesh that combines the advantages of skinning to particles and skinning to clusters, maintains rotation information, and does not require the visual mesh vertex to be within the convex hull of particles.

SUMMARY

Embodiments of the present invention provide a method for simulating deformable solids undergoing large plastic deformation and topological changes using shape matching within a position based dynamics (PBD) framework. Positional information for particles and orientation information from clusters is used to simulate deformable solids represented by particles. Each visual vertex stores references to particles that influence the vertex, and stores the local position of the particles. A two-step computer-implemented method interpolates orientation from clusters to particles, and uses the orientation and position of particles to skin the visual mesh vertices. This method results in a fast computation that can reproduce rotation and does not require the visual mesh vertex to be located within a convex hull of particles.

According to one embodiment, a computer-implemented method for skinning a visual mesh in a cluster based computer simulation is described. The method includes storing a list of particles that influence a visual vertex of the visual mesh, where the list of particles include local positions of the particles, determining a cluster of the particles that satisfies a shape matching constraint, where the cluster of particles include orientation information, interpolating orientations of the particles based on the orientation information, interpolating a position of the visual vertex based on the local positions of the particles, a local position of the visual vertex, and the orientations the particles, and skinning the visual mesh to the particles using the position of the visual vertex.

According to another embodiment, a computer-implemented method for skinning a visual mesh in a cluster based computer simulation is described, including performing cluster shape matching on a plurality of clusters of the cluster based simulation using a parallel position based dynamic constraint solver at a first time step of said cluster based simulation, where said clusters include particles having known velocities, updating said velocities at a second time step of said cluster based simulation based on an external force, extracting rotational components from current poses of the particles using polar decomposition, computing optimal stretch matrices for the plurality of clusters, updating a plastic deformation model based on the optimal stretch matrices, the velocities, and the rotational components, interpolating orientations of the particles based on the orientation information of the particles, interpolating a position of a visual vertex based on local positions of the particles, a local position of the visual vertex, and the orientations the particles, and skinning the visual mesh to the particles using the position of the visual vertex.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method performed on a computer system. Although steps and sequencing thereof are disclosed in a figure herein (e.g., FIG. 2) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "simulating," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Embodiments of the present invention are drawn to computer system capable of executing instructions to simulate moving particles and render computer graphics. The following discussion describes one such exemplary computer system.

Figure 1:
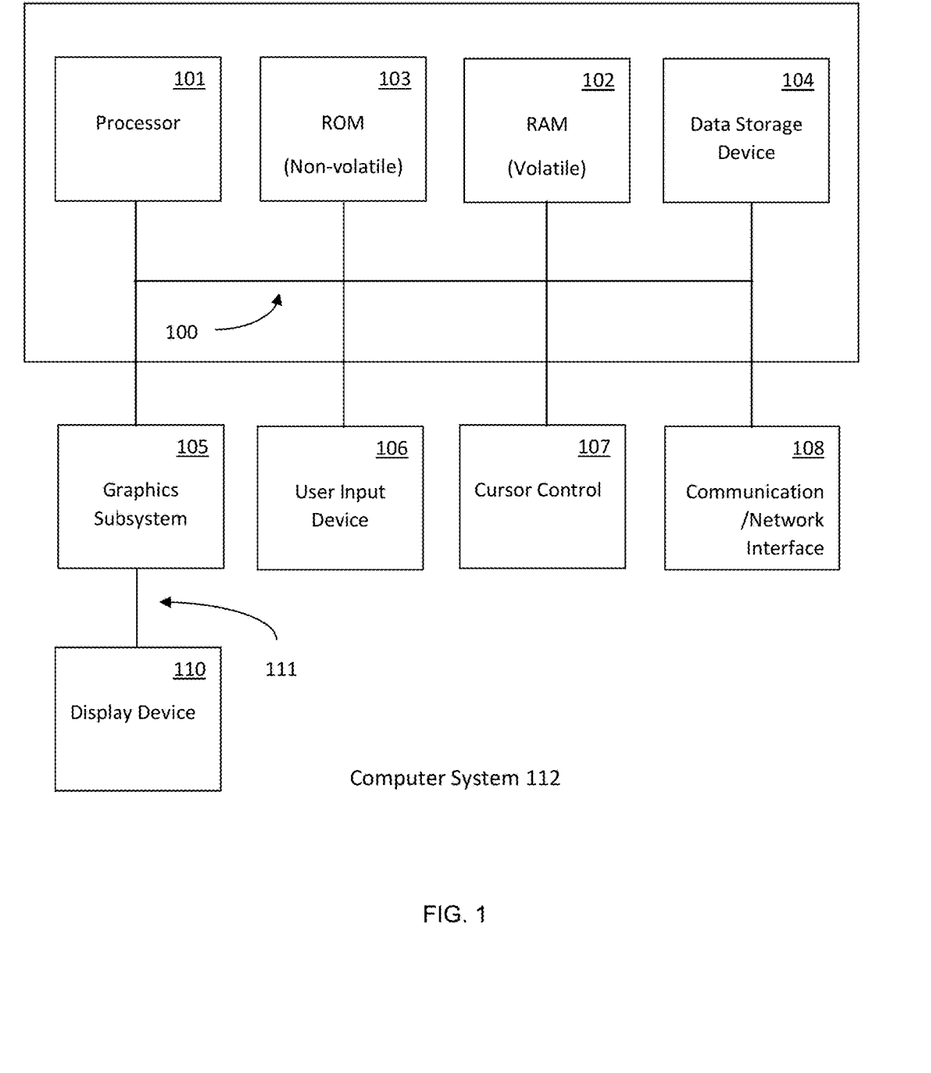
FIG. 1 is a block diagram of an exemplary computer system used in a process for skinning a cluster based simulation with a visual mesh according to embodiments of the present invention.

In the example of FIG. 1, the exemplary computer system 112 includes a central processing unit (CPU) 101 for running software applications and optionally an operating system. Random access memory 102 and read-only memory 103 store applications and data for use by the CPU 101. Data storage device 104 provides non-volatile storage for applications and data and may include fixed disk drives, removable disk drives, flash memory devices, and CD-ROM, DVD-ROM or other optical storage devices. The optional user input 106 comprises devices that communicate inputs from one or more users to the computer system 112 (e.g., mice, joysticks, cameras, touch screens, and/or microphones).

In the embodiment of FIG. 1, a graphics subsystem 105 may be coupled with the data bus 100 and/or other components of the computer system 112. The graphics sub-system may comprise a physical graphics processing unit (GPU) and graphics/video memory. The GPU generates pixel data from rendering commands to create output images (e.g., frames). The graphics sub-system 105 outputs video data to display 110 using a connection such as HDMI, DVI, DisplayPort, VGA, etc., or using a wireless communicates protocol, such as Wi-Fi or Miracast. The components of the computer system 112, including the CPU 101, memory 102/103, data storage 104, user input devices 106, and the display device 110, may be coupled via one or more data buses 100.

A communication or network interface 108 allows the computer system 112 to communicate with other computer systems, networks, or devices via an electronic communications network, including wired and/or wireless communication and including an Intranet or the Internet.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Simulating Elastic and Plastic Deformation

Embodiments of the present invention provide a computer-implemented method for simulating deformable solids undergoing large plastic deformation and topological changes using shape matching. More specifically, positional information for particles and orientation information from clusters is used to simulate deformable solids represented by particles. Each visual vertex stores references to particles that influence the vertex, and stores the local position of the particles. During runtime, the orientation of each shape matching cluster is interpolated to the particles. According to some embodiments, the techniques are implemented within a position based dynamics (PBD) framework. This expands the versatility of PBD which was previously shown to be able to simulate rigid bodies, liquids, gases, cloth, and deformable solids with moderate plastic deformation.

According to some embodiments, a cluster's orientation is represented as a quaternion, and a normalized weighted sum of the quaternions of the clusters influencing each particle is used to interpolate orientation information. For the visual vertex, the position of the visual vertex relative to the particles influencing it is interpolated based on the particle's position, the local position of the visual vertex (with respect to the particle), and the interpolated orientation. If the average quaternion of particle i is $Q_i$, and each visual mesh vertex stores particle indices $l_a$, local positions $z_a$, and weights $w_a$, the position y of the visual mesh vertex is computed as $y=\Sigma_a^4 w_a(Ql_a z_a + xl_a)$. After new vertex positions are determined, topological changes are resolved, and visual mesh vertices not within a predetermined distance of a particle may be deleted.

According to some embodiments, a two-step computer-implemented method interpolates orientation from clusters to particles, and uses the orientation and position of particles to skin the visual mesh vertices. This results in a fast method that can reproduce rotation and does not require the visual mesh vertex to be located within a convex hull of particles.

Objects may initially be represented by a set of particles and an explicit surface mesh. States of the particles are advanced at every step when simulating elastic and plastic deformation. The explicit surface mesh is then advected (e.g., shaped or transformed) with the particles via skinning.

Cluster shape matching is used as a constraint in a parallel position based dynamic constraint solver. Specifically, solid objects are discretized using a set of particles $p_i \epsilon P$, with masses mi, positions pi, and velocities vi. To advance the simulation by a time step $\Delta t$, external forces are applied to the velocities $v_i \leftarrow v_i + \Delta t f_{ext}(x_i)$. The updated velocities are used to compute predicted positions of the particle $x^*_i \leftarrow x_i + \Delta t v_i$. The constraint solver may perform a number of projection iterations on the predicted positions. In each iteration, all positional constraints are projected in parallel. The correction vectors from different constraints are accumulated in a variable $\Delta x_i$ for each particle. These variables are used to update $x^*_i \leftarrow x^*_i \leftarrow x_i + x/n_i$, where $n_i$ is the number of constraints affecting particle i. After a given number of solver iterations the velocities are updated using $$v_i \leftarrow \frac{1}{\Delta t}(x^*_i - x_i) \text{ and } x_i \leftarrow x^*_i.$$

Cluster shape matching is used to hold the particles together. The particles are grouped into clusters of overlapping sub-sets of particles. A set of particles C represents the particles in a cluster, $F_P$ represents a plastic deformation matrix (initialized to identity), and $q_i$ represents the local position of particle i with respect to the cluster's center of mass. The cluster's center of mass is represented by c. Following the shape matching approach, the current pose is determined:

$$A_{pq} = \left(\sum_{i \in C} m_i p_i q_i^T\right) F_P^T$$

The rotational component of the matched linear transformation is extracted from the current pose using polar decomposition $A_{pq}=RS_{pq}$. The goal position of particle i is computed as $g_i=RFPq_i+c$. Further, $\Delta x_i$ is updated using $\Delta x_i \leftarrow \Delta x_i + K(g_i - x_i)$, where $0 \le K \le 1$ represents the stiffness of the cluster, and $F_p$ is updated using the plastic deformation model. First $A_{qq}$ computed using:

$$A_{qq} = FP\left(\sum_{i \in C} m_i q_i q_i^T\right) F_P^T$$

$A_{qq}$ is then diagonalized to obtain:

$$A_{qq} = V_{qq} \text{diag}(\lambda_1^{qq}, \lambda_2^{qq}, \lambda_3^{qq}) V_{qq}^T$$

The optimal stretch matrix S is computed using:

$$S = V_{qq}[(V_{qq}^T S_{pq} V_{qq}) \bigcirc \overline{\lambda}^{qq}] V_{qq}^T$$

S is decomposed using $S=V\Lambda V^T$, where $\Lambda=\text{diag}(\lambda_1, \lambda_2, \lambda_3)$. The logarithmic strain $\varepsilon_l = V \log(\Lambda) V^T$ is used as a strain measure for a multiplicative plasticity model. The plastic deformation $F_p$ is updated as:

$$F_P \leftarrow V(|\Lambda|^{-1/3}\Lambda)^\gamma V^T F_P$$

In this case, $$\gamma = \min\left(\frac{(\upsilon(\|\varepsilon_l\|-\varepsilon\gamma))}{\|\varepsilon_l\|}, 1\right)$$

indicates the magnitude of elastic deformation transferred to the plastic component, $\upsilon$ represents the plastic flow rate, and $\|\varepsilon_l\|=\max_i(|\log(\lambda_i)|)$. If hardening is desired, the plastic yield $\varepsilon_\gamma$ may be updated by $\varepsilon_\gamma \leftarrow \kappa \|\varepsilon_l\| \Delta t$, where $\kappa$ is a coefficient that controls the amount of plastic hardening.

To improve stability, for relatively strong or violent interactions, diagonal entries of the diagonal matrix $(|\Lambda|^{-1/3}\Lambda)^\gamma$ may be clamped to between 0.8 to 1.2, which prevents $F_p$ from changing more than 20% in a single time step.

Visual Mesh Skinning of Moving Particles

A visual mesh (e.g., a triangle mesh) is subsequently skinned to the simulated moving particles of the clusters using linear blend skinning, multi-weight enveloping, animation space, or dual quaternion skinning, for example. A texture may optionally be applied to the mesh for rendering.

To skin the visual mesh, first, the orientation R of the shape matching clusters is interpolated to the particles. According to some embodiments, the normalized average of the quaternions of the clusters influencing each particle (e.g., the best fit rotation in a geodesic distance measure) is used to skin the visual mesh. Where the normalized average quaternion of particle i is $Q_i$, each vertex of the visual mesh stores particle indices $l_a$, local positions $z_a$, and weights $w_a$, where $1 \le a \le 4$.

The visual mesh is not skinned directly to the clusters because the particles contain positional details that the clusters cannot represent. As the particles do not store orientation information needed for skinning, the orientation of the particles is interpolated from the orientation information of the clusters, and the visual mesh is skinned to the particles.

According to some embodiments, after the new vertex positions are determined, topological changes are resolved and good triangle quality is ensured. Visual mesh vertices having no particle within a predetermined distance are removed.

Figure 2:
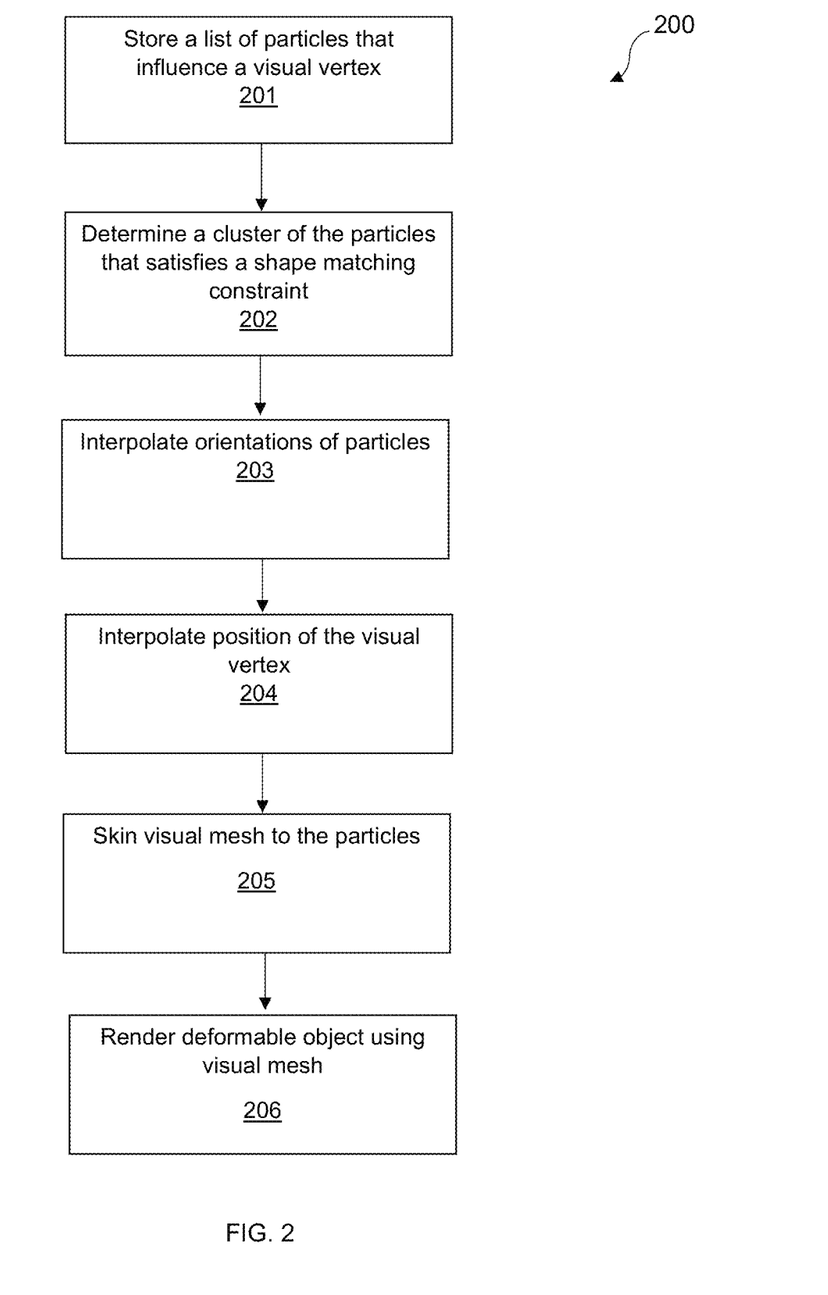
FIG. 2 is a flowchart depicting an exemplary sequence of computer-implemented steps for skinning a visual mesh to particles according to embodiments of the present invention.

With regard to FIG. 2, a flowchart depicting an exemplary sequence of computer-implemented steps 200 for skinning a visual mesh to particles in a cluster based simulation is depicted according to embodiments of the present invention. At step 201, a list of particles that influence a visual vertex of the visual mesh is stored in memory. The list of particles includes the current local positions of the particles. At step 202, a cluster of the particles that satisfies a shape matching constraint is determined, where the cluster of particles includes orientation information. At step 203, orientations of the particles are interpolated from the orientation information of the cluster. At step 204, a position of the visual vertex is interpolated based on the local positions of the particles, a local position of the visual vertex, and the orientations the particles. At step 205, the visual mesh is skinned to the particles using the position of the visual vertex, and a texture is optionally applied to the visual mesh. At step 206, a deformable object is rendered using the visual mesh.

Exemplary Visual Mesh Skinning of Deformable Objects

Figure 3:
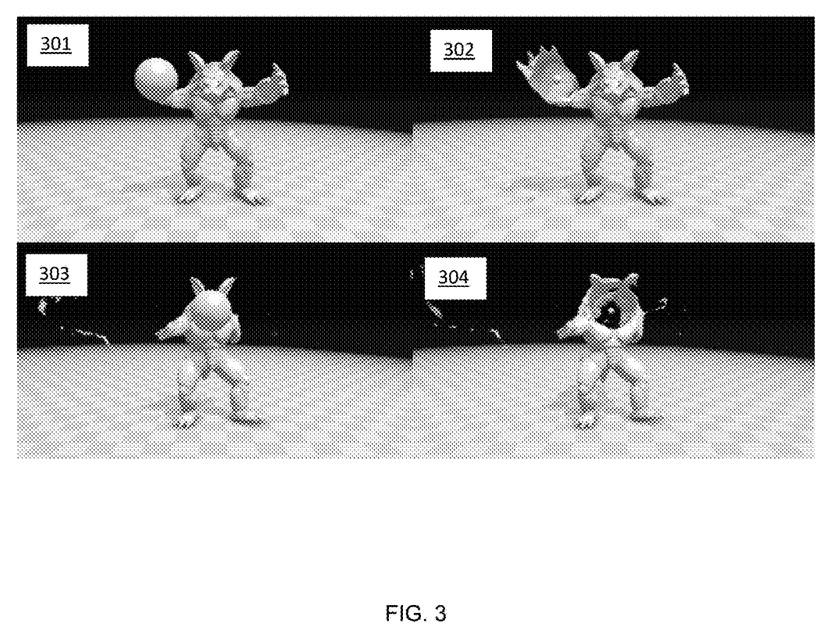
FIG. 3 is a screenshot of an animation of an exemplary deformable object depicted at different stages of deformation, where the deformable object is contacted by a moving object, and where the deformable object is rendered using computer simulation teachings that involve using particles skinned by a visual mesh according to embodiments of the present invention.

With regard to FIG. 3, an exemplary deformable object, an armadillo-shaped solid, is depicted at different stages and times of deformation, where the deformable object is rendered using particles skinned by a visual mesh according to embodiments of the present invention. As depicted in FIG. 3, the deformation of the deformable object is performed using the exemplary values $\varepsilon_\gamma=0.1$, $\upsilon=0.9$, $\kappa=0$ and K=0.1.

At time 301, the right arm of the deformable object is contacted by a moving sphere. At time 302, the moving sphere has caused the hand and arm of the deformable object to flatten and become larger in area. At time 303, the right arm of the deformable object has been severed due to the impact, and a second moving sphere is approaching the deformable objects head. At time 304, the object has passed through the head of the deformable object creating a large hole.

Figure 4:
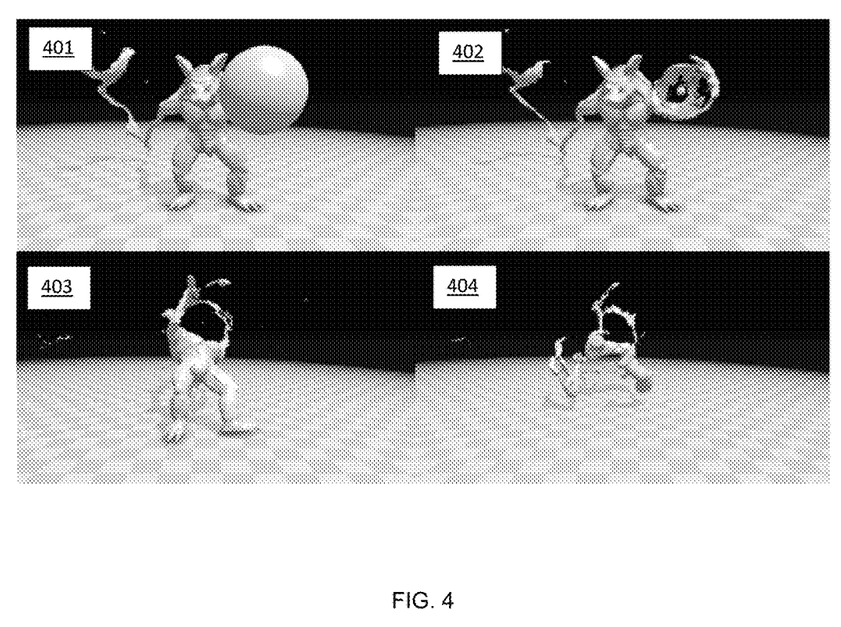
FIG. 4 is a screenshot of an animation of an exemplary deformable object depicted at different stages of deformation, where the deformable object is contacted by a rapidly moving object, and where the deformable object is rendered using computer simulation teachings that involve using particles skinned by a visual mesh according to embodiments of the present invention.

With regard to FIG. 4, the armadillo-shaped solid is depicted at different times and stages of deformation caused by a relatively violent collision, where the deformable object is rendered using particles skinned by a visual mesh according to embodiments of the present invention. As depicted in FIG. 4, the deformation of the deformable object is performed using the exemplary values $\varepsilon_\gamma=0.1$, $\upsilon=0.9$, $\kappa=0$ and K=0.1.

The left arm of the deformable object is contacted by a rapidly moving sphere at time 401. At time 402, the rapidly moving sphere has severely deformed the hand and arm of the deformable object. At time 403, the deformable object is knocked backwards due to the impact, and a second rapidly moving sphere is approaching the deformable objects head. At time 404, the second rapidly moving sphere has contacted the deformable object and the deformable object is greatly deformed.

Figure 5:
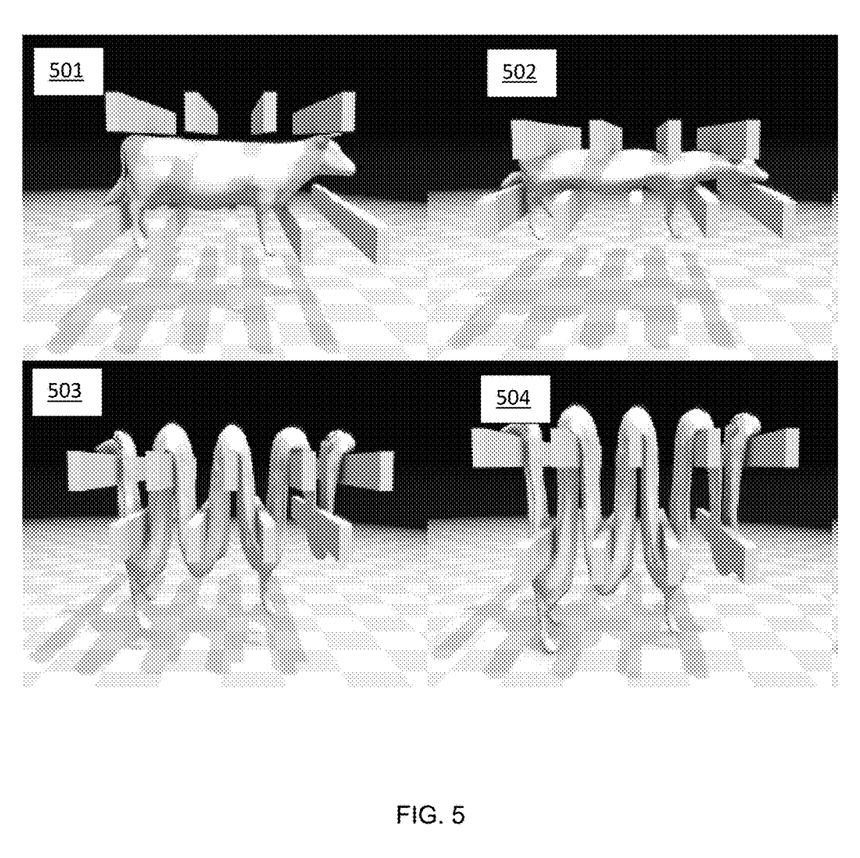
FIG. 5 is a screenshot of an animation of an exemplary deformable object depicted at different stages of deformation, where the deformable object is contacted and stretched by a series of bars moving in a vertical direction, and where the deformable object is rendered using computer simulation teachings that involve using particles skinned by a visual mesh according to embodiments of the present invention.

With regard to FIG. 5, an exemplary deformable object, a cow-shaped solid, is depicted at different times and stages of deformation, where the deformable object is rendered using particles skinned by a visual mesh according to embodiments of the present invention. As depicted in FIG. 5, the deformation of the deformable object is performed using the exemplary values $\varepsilon_\gamma=10^{-4}$, $\upsilon=0.99$, $\kappa=0$ and K=0.5.

The deformable object is in an initial state between two sets of moving rigid bars at time 501. At time 502, the moving rigid bars begin to contact and compress the deformable object. At time 503, the deformable object is stretched and deformed. At time 504, the moving ridged bars move farther apart, causing the deformable object to further stretch and deform.

Figure 6:
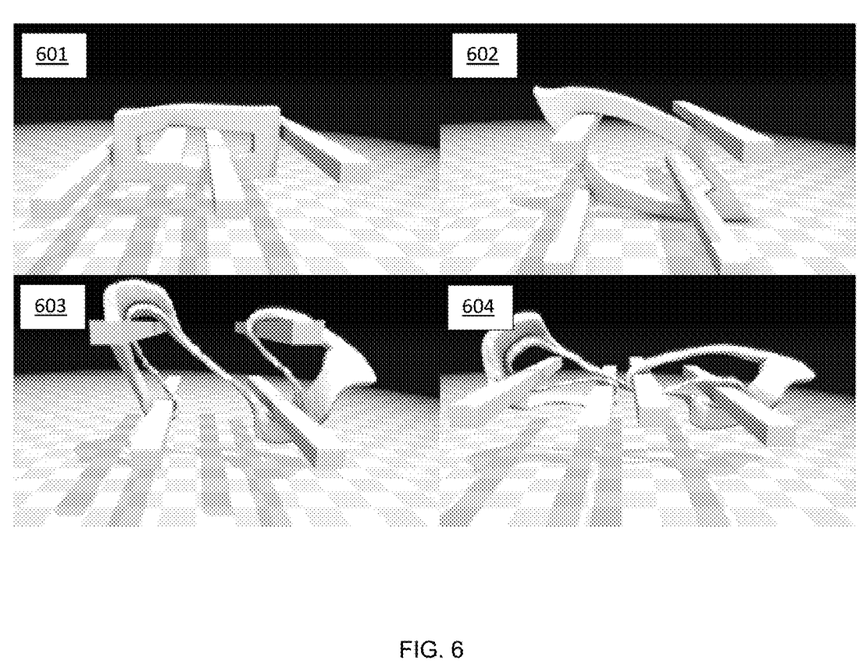
FIG. 6 is a screenshot of an animation of an exemplary deformable object depicted at different stages of deformation, where the deformable object is contacted by rotating bars that stretch the deformable object, and where the deformable object is rendered using computer simulation teachings that involve using particles skinned by a visual mesh according to embodiments of the present invention.

With regard to FIG. 6, an exemplary deformable object, a square made of a taffy-like material, is depicted at different times and stages of deformation, where the deformable object is rendered using particles skinned by a visual mesh according to embodiments of the present invention. As depicted in FIG. 6, the deformation of the deformable object is performed using the exemplary values $\varepsilon_\gamma=10^{-4}$, $\upsilon=0.99$, $\kappa=0$ and K=0.99.

The deformable object is in an initial state between a set of moving rigid bars configured to simulate a taffy pulling machine at time 601. At time 602, the moving rigid bars begin to rotate and contact and deform the deformable object, causing the deformable object bend slightly. At time 603, the deformable object is greatly stretched and deformed. At time 604, the moving ridged bars continue to move, causing the deformable object to stretch into thin ropes.

Figure 7:
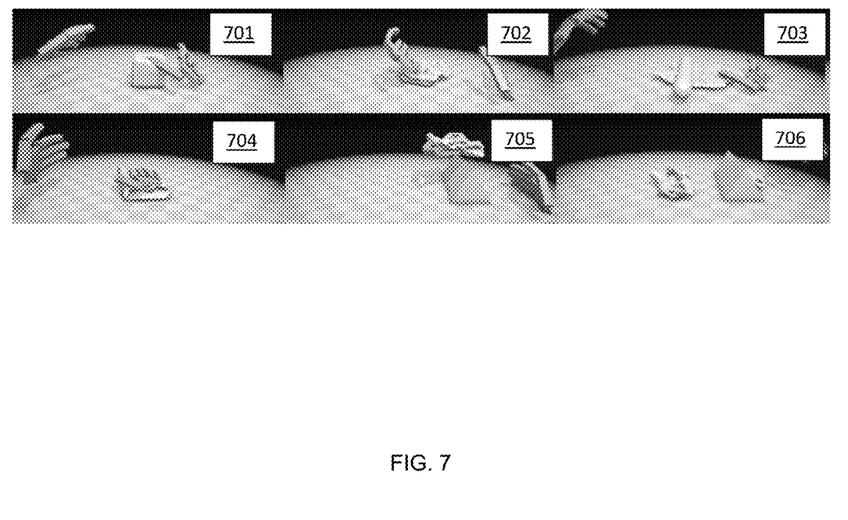
FIG. 7 is a screenshot of an animation of an exemplary deformable object depicted at different stages of deformation, where the deformable object is manipulated by virtual hands as measured by an input device, and where the deformable object is rendered using computer simulation teachings that involve using particles skinned by a visual mesh according to embodiments of the present invention.

With regard to FIG. 7, an exemplary deformable cube of a dough-like substance is depicted at different times and stages of deformation, where the deformable object is using particles skinned by a visual mesh according to embodiments of the present invention. As depicted in FIG. 7, the deformation of the deformable object is performed using the exemplary values $\varepsilon_\gamma=0.1$, $\upsilon=0.9$, $\kappa=0$ and K=0.5.

The deformable object is in an initial state resting on a surface at time 701 when it is contacted by a virtual hand. The virtual hands are virtual representations of physical hands captured using an input device (e.g., a motion or hand tracking device). At time 702, the dough is flattened by the virtual hands. At time 703, the dough is flattened by a solid object, a rolling pin. At time 704, the dough is pressed down by the virtual hand. At time 705, the dough is placed above an edged object. At time 706, the dough deforms and splits in two due to the force of the edged object.

Embodiments of the present invention are thus described. While the present invention has been described in particular embodiments, it should be appreciated that the present invention should not be construed as limited by such embodiments, but rather construed according to the following claims.

What is claimed is:

1. A computer-implemented method for skinning a visual mesh in a cluster based computer graphics simulation, said method comprising:

storing a list of particles in memory that influence a visual vertex of the visual mesh, wherein the list of particles comprises local positions of the particles;

determining a cluster of the particles that satisfies a shape matching constraint, wherein the cluster of particles comprises orientation information of the cluster;

determining orientations of the particles by performing interpolation based on the orientation information of the cluster;

interpolating a position of the visual vertex based on the local positions of the particles, a local position of the visual vertex, and the orientations the particles; and skinning the visual mesh to the particles using the position of the visual vertex.

2. A method as described in claim 1, wherein the position of the visual vertex is computed using the formula $y=\Sigma_a^4 w_a(Ql_a z_a + xl_a)$, wherein $Q_i$, represents an average quaternion of a particle i, $l_a$ represents a particle index, $z_a$ represents the local position of the visual vertex, and $w_a$ represents a weight of the visual vertex.

3. A method as described in claim 1, wherein the determining orientations of the particles based on the orientation information of the clusters comprises calculating a normalized weighted sum of quaternions of clusters influencing the particles.

4. A method as described in claim 1, further comprising using the visual mesh to simulate a deformable object.

5. A method as described in claim 1, wherein said skinning the visual mesh to the particles using the position of the visual vertex comprises performing at least one of linear blend skinning, multi-weight enveloping, animation space skinning, and dual quaternion skinning.

6. A method as described in claim 1, further comprising advancing a state of the particles by simulating at least one of elastic deformation and plastic deformation.

7. A method as described in claim 1, further comprising deleting an isolated visual vertex if there are no particles within a threshold distance of the isolated visual vertex.

8. A computer-implemented method for skinning a visual mesh in a cluster based computer simulation, said method comprising:
   performing cluster shape matching on a plurality of clusters of the cluster based simulation using a parallel position based dynamic constraint solver at a first time step of said cluster based simulation, wherein said clusters comprise particles having known velocities;
   updating said velocities at a second time step of said cluster based simulation based on an external force;
   extracting rotational components from current poses of the particles using polar decomposition;
   computing stretch matrices for the plurality of clusters;
   updating a plastic deformation model based on the stretch matrices, the velocities, and the rotational components;
   determining orientations of the particles by performing interpolation based on orientation information of the clusters;
   interpolating a position of a visual vertex based on local positions of the particles, a local position of the visual vertex, and the orientations the particles; and
   skinning the visual mesh to the particles using the position of the visual vertex.

9. A method as described in claim 8, wherein the position of the visual vertex is computed using the formula $y=\Sigma_a^4 w_a(Ql_a z + xl_a)$, wherein $Q_i$, represents an average quaternion of a particle i, $l_a$ represents a particle index, $z_a$ represents the local position of the visual vertex, and $w_a$ represents a weight of the visual vertex.

10. A method as described in claim 8, wherein the determining orientations of the particles based on the orientation information of the clusters comprises calculating a normalized weighted sum of quaternions of clusters influencing the particles.

11. A method as described in claim 8, further comprising using the visual mesh to simulate a deformable object.

12. A method as described in claim 8, wherein said skinning the visual mesh to the particles using the position of the visual vertex comprises performing at least one of linear blend skinning, multi-weight enveloping, animation space skinning, and dual quaternion skinning.

13. A method as described in claim 8, further comprising advancing a state of the particles by simulating at least one of elastic deformation and plastic deformation.

14. A method as described in claim 8, further comprising deleting an isolated visual vertex if there are no particles within a threshold distance of the isolated visual vertex.

15. A computer system for skinning a visual mesh in a cluster based computer simulation, said system comprising:
   a processor and memory configured to execute instructions of an application that simulates clusters of moving particles; and
   a graphics processing unit communicatively coupled to the processor and the memory, wherein the graphics processing unit is configured to perform a method of skinning a visual mesh in a cluster based simulation, said method comprising:
      storing a list of particles in said memory that influence a visual vertex of the visual mesh, wherein the list of particles comprises local positions of the particles;
      determining a cluster of the particles that satisfies a shape matching constraint, wherein the cluster of particles comprises orientation information of the clusters;
      determining orientations of the particles by performing interpolation based on the orientation information of the clusters;
      interpolating a position of the visual vertex based on the local positions of the particles, a local position of the visual vertex, and the orientations the particles; and
      skinning the visual mesh to the particles using the position of the visual vertex.

16. A system as described in claim 15, wherein the position of the visual vertex is computed using the formula $y=\Sigma_a^4 w_a(Ql_a z_a + xl_a)$, wherein $Q_i$, represents an average quaternion of a particle i, $l_a$ represents a particle index, $z_a$ represents the local position of the visual vertex, and $w_a$ represents a weight of the visual vertex.

17. A system as described in claim 15, wherein the determining orientations of the particles based on the orientation information of the clusters comprises calculating a normalized weighted sum of quaternions of clusters influencing the particles.

18. A system as described in claim 15, wherein the visual mesh simulates a deformable object.

19. A system as described in claim 15, wherein said skinning the visual mesh to the particles using the position of the visual vertex comprises performing at least one of linear blend skinning, multi-weight enveloping, animation space skinning, and dual quaternion skinning.

20. A system as described in claim 15, wherein said method further comprises advancing a state of the particles by simulating at least one of elastic deformation and plastic deformation.

21. A system as described in claim 15, wherein said method further comprises deleting an isolated visual vertex if there are no particles within a threshold distance of the isolated visual vertex.

* * * * *